(12) United States Patent
Knaupp et al.

(10) Patent No.: US 7,464,630 B2
(45) Date of Patent: Dec. 16, 2008

(54) APPARATUS FOR GENERATING AND MANIPULATING A HIGH-PRESSURE FLUID JET

(75) Inventors: Michael Knaupp, Zaisenhausen (DE); Charles D. Burnham, Southbury, CT (US); Mohamed A. Hashish, Bellevue, WA (US); Robert J. Mann, Puyallup, WA (US); Mira K. Sahney, Seattle, WA (US); C. David Bader, Louisville, KY (US); Andreas Meyer, Bretten (DE); Sean A. Vaughan, Sumner, WA (US); Thomas A. Pesek, Darmstadt (DE); Jonathan M. Stewart, Seattle, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 09/940,689

(22) Filed: Aug. 27, 2001

(65) Prior Publication Data

US 2003/0037650 A1   Feb. 27, 2003

(51) Int. Cl.
   B26F 3/00 (2006.01)
   B24C 5/00 (2006.01)
   B24C 3/06 (2006.01)

(52) U.S. Cl. .............................. 83/177; 451/91; 451/92

(58) Field of Classification Search ................... 83/177, 83/53; 451/91, 92; 239/422, 427.5, 428, 239/433, 283; 403/237, 119, 396, 389; 248/229.13, 248/229.23, 230.4, 231.51; 606/159, 160, 606/167

See application file for complete search history.

(56) References Cited

U.S. PATENT DOCUMENTS 1,701,281 A * 2/1929 Sprague ..................... 279/111

(Continued)

FOREIGN PATENT DOCUMENTS

DE   593 057   2/1934

(Continued)

OTHER PUBLICATIONS

Arola and Ramulu, "Abrasive Waterjet Machining of Titanium Alloy," in *Proceedings of the 8th American Water Jet Conference*, WaterJet Technology Association, Houston, TX, Aug. 26-29, 1995, pp. 389-408.

(Continued)

*Primary Examiner*—Jason Prone
(74) *Attorney, Agent, or Firm*—Seed Intellectual Property Law Group PLLC

(57) ABSTRACT

An apparatus for generating and manipulating a high-pressure fluid jet includes an end effector assembly coupled to a manipulator that imparts motion to the end effector. The end effector assembly includes a cutting head coupled to a source of high-pressure fluid and to a source of abrasive. A motion assembly is coupled to the cutting head via a clamp positioned around the cutting head. A nozzle body assembly is removably coupled to the cutting head assembly, which may be separated from the cutting head assembly to allow access to the orifice, without removing the cutting head assembly from the clamp. The clamp has a quick release mechanism and an alignment member. The motion assembly includes two motors coupled together to form a gimbal wrist, each motor having a horizontal axis of rotation. The two axes of rotation are perpendicular to each other, but are not necessarily aligned with the manipulator's axes of motion.

40 Claims, 7 Drawing Sheets

U.S. PATENT DOCUMENTS

| | | | | |
|---|---|---|---|---|
| 3,510,065 | A | | 5/1970 | Gigantino et al. ............ 239/590 |
| 3,638,864 | A | * | 2/1972 | Roeder et al. ............. 239/424.5 |
| 3,877,334 | A | * | 4/1975 | Gerber ......................... 83/177 |
| 3,978,748 | A | * | 9/1976 | Leslie et al. ..................... 83/53 |
| 4,216,913 | A | * | 8/1980 | Troup ......................... 239/230 |
| 4,272,017 | A | | 6/1981 | Franz ............................. 239/1 |
| 4,555,872 | A | | 12/1985 | Yie ............................. 51/439 |
| 4,650,164 | A | | 3/1987 | Shepherd ..................... 256/68 |
| 4,693,153 | A | | 9/1987 | Wainwright et al. ........... 83/53 |
| 4,817,874 | A | | 4/1989 | Jarzebowicz ................ 239/434 |
| 4,900,198 | A | * | 2/1990 | Hoaki ......................... 83/177 |
| 4,934,111 | A | | 6/1990 | Hashish et al. ................ 51/410 |
| 4,937,985 | A | * | 7/1990 | Boers et al. .................. 83/177 |
| 4,945,688 | A | | 8/1990 | Yie ............................. 51/439 |
| 4,951,429 | A | | 8/1990 | Hashish et al. ................ 51/439 |
| 5,018,317 | A | | 5/1991 | Kiyoshige et al. ............ 51/410 |
| 5,018,667 | A | | 5/1991 | Lloyd ...................... 239/132.5 |
| 5,018,670 | A | | 5/1991 | Chalmers .................... 239/433 |
| 5,052,624 | A | | 10/1991 | Boers et al. ................. 239/525 |
| 5,092,085 | A | | 3/1992 | Hashish et al. ................ 51/410 |
| 5,144,766 | A | | 9/1992 | Hashish et al. ................ 51/439 |
| 5,199,342 | A | | 4/1993 | Hediger ....................... 83/177 |
| 5,199,640 | A | | 4/1993 | Ursic ........................... 239/11 |
| 5,234,185 | A | * | 8/1993 | Hoffman et al. ............. 248/56 |
| 5,320,289 | A | | 6/1994 | Hashish et al. ............. 239/434 |
| 5,372,540 | A | | 12/1994 | Burch et al. ................ 452/156 |
| 5,469,768 | A | * | 11/1995 | Schumacher ................ 83/177 |
| 5,508,596 | A | | 4/1996 | Olsen ......................... 318/567 |
| 5,584,016 | A | | 12/1996 | Varghese et al. ........ 364/468.03 |
| 5,591,184 | A | | 1/1997 | McDonnell et al. ......... 606/167 |
| 5,599,328 | A | | 2/1997 | Stevens ...................... 604/283 |
| 5,605,492 | A | | 2/1997 | Klingel ......................... 451/40 |
| 5,636,558 | A | * | 6/1997 | Sanders et al. ................. 83/53 |
| 5,643,058 | A | | 7/1997 | Erichsen et al. .............. 451/99 |
| 5,782,673 | A | | 7/1998 | Warehime ..................... 451/2 |
| 5,785,582 | A | | 7/1998 | Stefanik et al. ............ 451/102 |
| 5,794,858 | A | * | 8/1998 | Munoz ......................... 83/177 |
| 5,848,753 | A | | 12/1998 | Wands et al. ................ 239/596 |
| 5,851,139 | A | | 12/1998 | Xu .............................. 451/102 |
| 5,854,744 | A | | 12/1998 | Zeng et al. .................. 364/154 |
| 6,012,653 | A | | 1/2000 | Gunther et al. ............. 239/434 |
| 6,036,116 | A | | 3/2000 | Bui ............................. 239/432 |
| 6,077,152 | A | | 6/2000 | Warehime .................... 451/75 |
| 6,119,964 | A | * | 9/2000 | Lombari ........................ 83/53 |
| 6,126,154 | A | | 10/2000 | Shepherd .................... 267/150 |
| 6,126,524 | A | | 10/2000 | Shepherd ..................... 451/75 |
| 6,149,509 | A | | 11/2000 | Bruns et al. .................. 451/90 |
| 6,155,245 | A | | 12/2000 | Zanzuri ....................... 125/12 |
| 6,168,503 | B1 | | 1/2001 | Pao et al. ...................... 451/40 |
| 6,186,422 | B1 | | 2/2001 | Hubner et al. .............. 239/589 |
| 6,200,203 | B1 | | 3/2001 | Xu et al. ....................... 451/99 |
| 6,220,529 | B1 | * | 4/2001 | Xu .............................. 83/177 |
| 6,227,951 | B1 | | 5/2001 | Fredrick ..................... 451/102 |
| 6,237,904 | B1 | | 5/2001 | Shepherd .................... 267/150 |
| 6,280,302 | B1 | | 8/2001 | Hashish et al. ............. 451/102 |
| 6,283,832 | B1 | | 9/2001 | Shepherd ..................... 451/40 |
| 6,293,857 | B1 | | 9/2001 | Allard ........................ 451/102 |
| 6,305,261 | B1 | * | 10/2001 | Romanini ..................... 83/53 |
| 6,379,214 | B1 | * | 4/2002 | Stewart et al. ................ 83/177 |
| D460,094 | S | * | 7/2002 | Mann et al. ................ D15/199 |
| 6,425,805 | B1 | * | 7/2002 | Massa et al. .................. 451/91 |
| 6,502,767 | B2 | | 1/2003 | Kay et al. ................... 239/433 |
| 6,540,586 | B2 | * | 4/2003 | Sciulli ......................... 83/177 |
| 6,543,462 | B1 | | 4/2003 | Lewis et al. ................ 239/242 |
| 6,601,783 | B2 | * | 8/2003 | Chisum et al. ............. 239/433 |
| 6,705,921 | B1 | * | 3/2004 | Shepherd ..................... 451/86 |
| 6,766,216 | B2 | * | 7/2004 | Erichsen et al. .............. 83/177 |
| 6,908,372 | B2 | * | 6/2005 | Larsson ....................... 83/177 |
| 7,074,112 | B2 | * | 7/2006 | Olsen ......................... 83/177 |
| 2002/0066345 | A1 | * | 6/2002 | Shepherd et al. .............. 83/53 |
| 2003/0037654 | A1 | * | 2/2003 | Sciulli et al. ................. 83/177 |
| 2003/0167104 | A2 | * | 9/2003 | Erichsen et al. ............. 700/281 |
| 2004/0107810 | A1 | * | 6/2004 | Sciulli et al. .................. 83/177 |
| 2008/0110312 | A1 | * | 5/2008 | Knaupp et al. ................ 83/177 |

FOREIGN PATENT DOCUMENTS

| | | |
|---|---|---|
| DE | 94 02 938.5 | 5/1994 |
| DE | 198 10 333 A1 | 9/1999 |
| EP | 0 119 338 A1 | 9/1984 |
| EP | 0 223 433 A1 | 5/1987 |
| EP | 0 307 174 A1 | 3/1989 |
| EP | 0 375 887 B1 | 7/1990 |
| EP | 0 469 221 A1 | 2/1992 |
| FR | 2 699 852 | 7/1994 |
| JP | 63-134848 | 9/1988 |
| JP | 2-56599 | 4/1990 |
| JP | 07-074214 | 3/1995 |
| WO | 92/19384 | 11/1992 |
| WO | WO 95/21044 | 8/1995 |
| WO | WO 01/14101 A2 | 3/2001 |

OTHER PUBLICATIONS

Arola and Ramulu, "Mechanisms of Material Removal in Abrasive Waterjet Machining of Common Aerospace Materials," in *Proceedings of the 7th American Water Jet Conference*, WaterJet Technology Association, Seattle, WA, Aug. 28-31, 1993, pp. 43-64.

Hamatani and Ramulu, "Machinability of High Temperature Composites by Abrasive Waterjet," in *Proceedings of The Winter Annual Meeting of The American Society of Mechanical Engineers*, The American Society of Mechanical Engineers, Chicago, IL, Nov. 27-Dec. 2, 1988, pp. 49-62.

Hashish, "Applications of Precision AWJ Machining," in *Proceedings of the 6th American Water Jet Conference*, WaterJet Technology Association, Houston, TX, Aug. 24-27, 1991.

Hashish and du Plessis, "Prediction Equations Relating High Velocity Jet Cutting Performance to Stand Off Distance and Multipasses," in *Proceedings of the Winter Annual Meeting of The American Society of Mechanical Engineers*, The American Society of Mechanical Engineers, San Francisco, CA, Dec. 10-15, 1978.

Hashish, "Controlled-Depth Milling Techniques Using Abrasive-Waterjets," in *Proceedings of the 12th International Conference on Jet Cutting Technology*, BHR Group Limited, Rouen, France, Oct. 25-27, 1994, pp. 449-461.

Hashish, "Deep Hole Drilling in Metals Using Abrasive-Waterjets," in *Proceedings of the 13th International Conference on Jetting Technology*, BHR Group Limited, Sardinia, Italy, Oct. 29-31, 1996, pp. 691-707.

Hashish, "Status and Potential of Waterjet Machining of Composites," in *Proceedings of the 10th American Waterjet Conference*, WaterJet Technology Association, Houston, TX, Aug. 14-17, 1999, pp. 811-827.

Hashish, "Turning, Milling, and Drilling With Abrasive-Waterjets," in *Proceedings of the 9th International Symposium on Jet Cutting Technology*, BHRA, Sendai, Japan, Oct. 4-6, 1988, pp. 113-131.

Henning and Anders, "Cutting-edge quality improvements through geometrical modelling," in *Proceedings of the 14th International Conference on Jetting Technology*, BHR Group Limited, Brugge, Belgium, Sep. 21-23, 1998.

Henning, "Computer Aided Manufacturing for Three-Dimensional Abrasive Water Jet Machining," in *Proceedings of the 9th American Waterjet Conference*, WaterJet Technology Association, Dearborn, MI, Aug. 23-26, 1997.

Holmqvist and Öjmertz, "Influence of Abrasive Waterjet Cutting on the Fatigue Properties of Extra High-Strength Steel," in *Proceedings of the 10th American Waterjet Conference*, WaterJet Technology Association, Houston, TX, Aug. 14-17, 1999, pp. 1-13.

Jenkins et al., "Abrasive Waterjet Machining Effects on the High Temperature Degradation and Mechanical Properties of a Ceramic Matrix Composite," in *Proceedings of the 9th American Waterjet Conference*, WaterJet Technology Association, Dearborn, MI, Aug. 23-26, 1997, pp. 157-171.

Ramulu and Arola, "Abrasive Waterjet Process Dependent Performance of Polymer Composites Under Static and Dynamic Loading,"

in *Proceedings of the 9th American Waterjet Conference*, WaterJet Technology Association, Dearborn, MI, Aug. 23-26, 1997, pp. 29-46.

Ramulu et al., "Abrasive Waterjet Drilling and Cutting Mechanisms in Continuous-Fiber Ceramic Composites," in *Proceedings of the 9th American Waterjet Conference*, WaterJet Technology Association, Dearborn, MI, Aug. 23-26, 1997, pp. 109-132.

Reichman and Cheung, "Waterjet Cutting of Deep-Kerfs," in *Proceedings of the Fourth International Symposium on Jet Cutting Technology*, BHRA Fluid Engineering, Canterbury, England, Apr. 12-14, 1978, pp. E2-11 and E2-21.

Sheridan et al., "Microstructural and Mechanical Characterization of Threaded Composite Tubes Machined Using AWJ Cutting," in *Proceedings of the 8th American Water Jet Conference*, WaterJet Technology Association, Houston, TX, Aug. 26-29, 1995, pp. 245-258.

Singh et al., "Comprehensive Evaluation of Abrasive Waterjet Cut Surface Quality," in *Proceedings of the 6th American Water Jet Conference*, WaterJet Technology Association, Houston, TX, Aug. 24-27, 1991, pp. 139-161.

Specifications for HD Systems, FHA Series of Hollow Shaft Servo Systems, 1999.

Whalen, "Application of Advanced Abrasive Waterjet Machining at GE Aircraft Engines," in *Proceedings of the 7th American Water Jet Conference*, WaterJet Technology Association, Seattle, WA, Aug. 28-31, 1993, pp. 883-897.

Zeng et al., "Characterization of Energy Dissipation Phenomenon in Abrasive Waterjet Cutting," in *Proceedings of the 6th American Water Jet Conference*, WaterJet Technology Association, Houston, TX, Aug. 24-27, 1991, pp. 163-177.

Ansari et al., "Effect of Waterjet Pressure on Thermal Energy Distribution in the Workpiece During Cutting With an Abrasive Waterjet," in *Proceedings of The Winter Annual Meeting of The American Society of Mechanical Engineers*, The American Society of Mechanical Engineers, Chicago, IL, Nov. 27-Dec. 2, 1988, pp. 141-148.

Hashish, "Characteristics of Surfaces Machined With Abrasive-Waterjets," in *Proceedings of The Winter Annual Meeting of The American Society of Mechanical Engineers*, The American Society of Mechanical Engineers, San Francisco, CA, Dec. 10-15, 1989, pp. 23-32.

Hashish, "Machining of Advanced Composites With Abrasive-Waterjets," in *Proceedings of The Winter Annual Meeting of The American Society of Mechanical Engineers*, The American Society of Mechanical Engineers, Chicago, IL, Nov. 27-Dec. 2, 1988, pp. 1-18.

Hashish, "The Effect of Beam Angle in Abrasive-Waterjet Machining," *J. of Engineering for Industry* 115:51-56, Feb. 1993.

Matsui et al., "High Precision Cutting Method For Metallic Materials By Abrasive Waterjet," in *Proceedings of the 6th American Water Jet Conference*, WaterJet Technology Association, Houston, TX, Aug. 24-27, 1991, pp. 127-137.

* cited by examiner

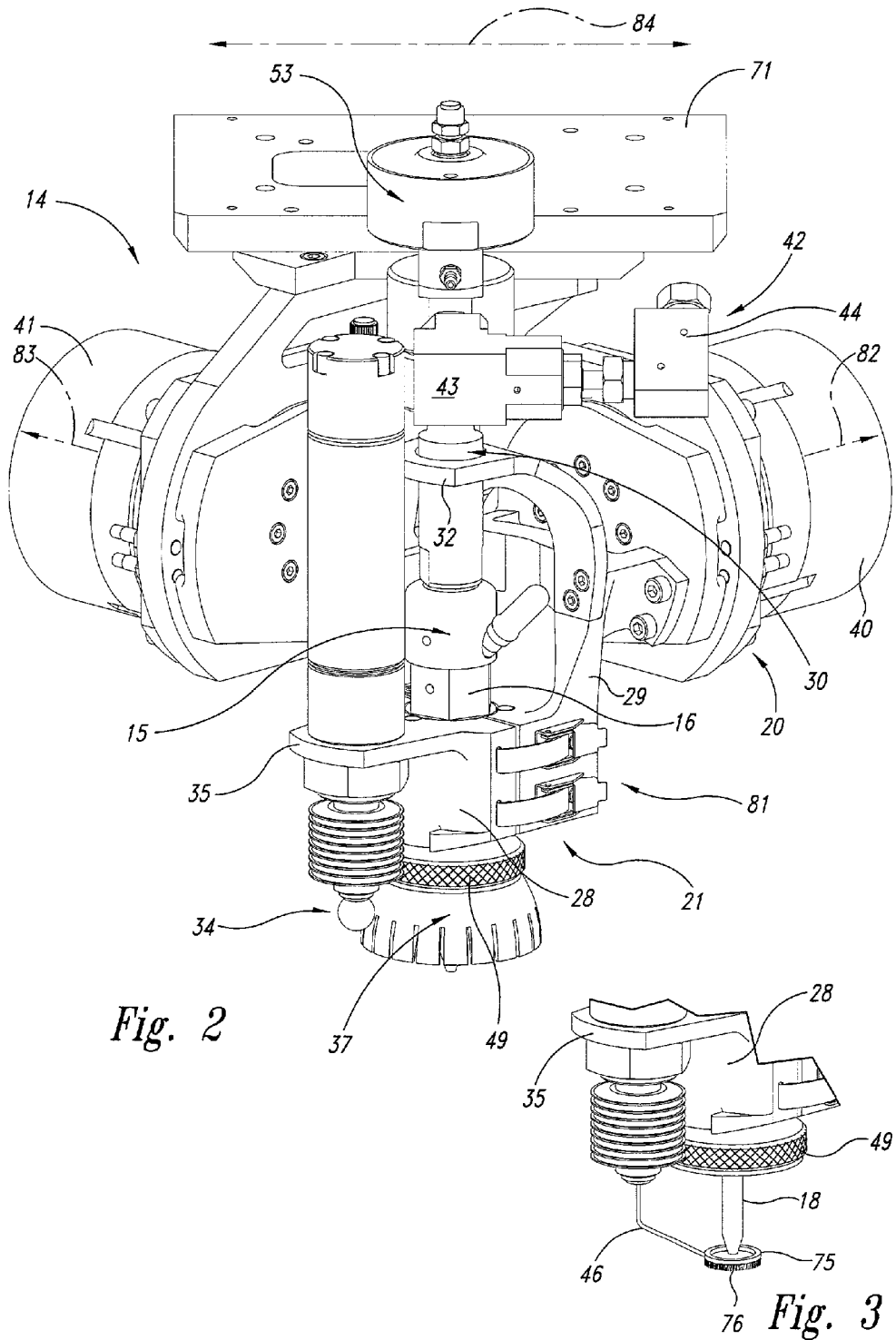

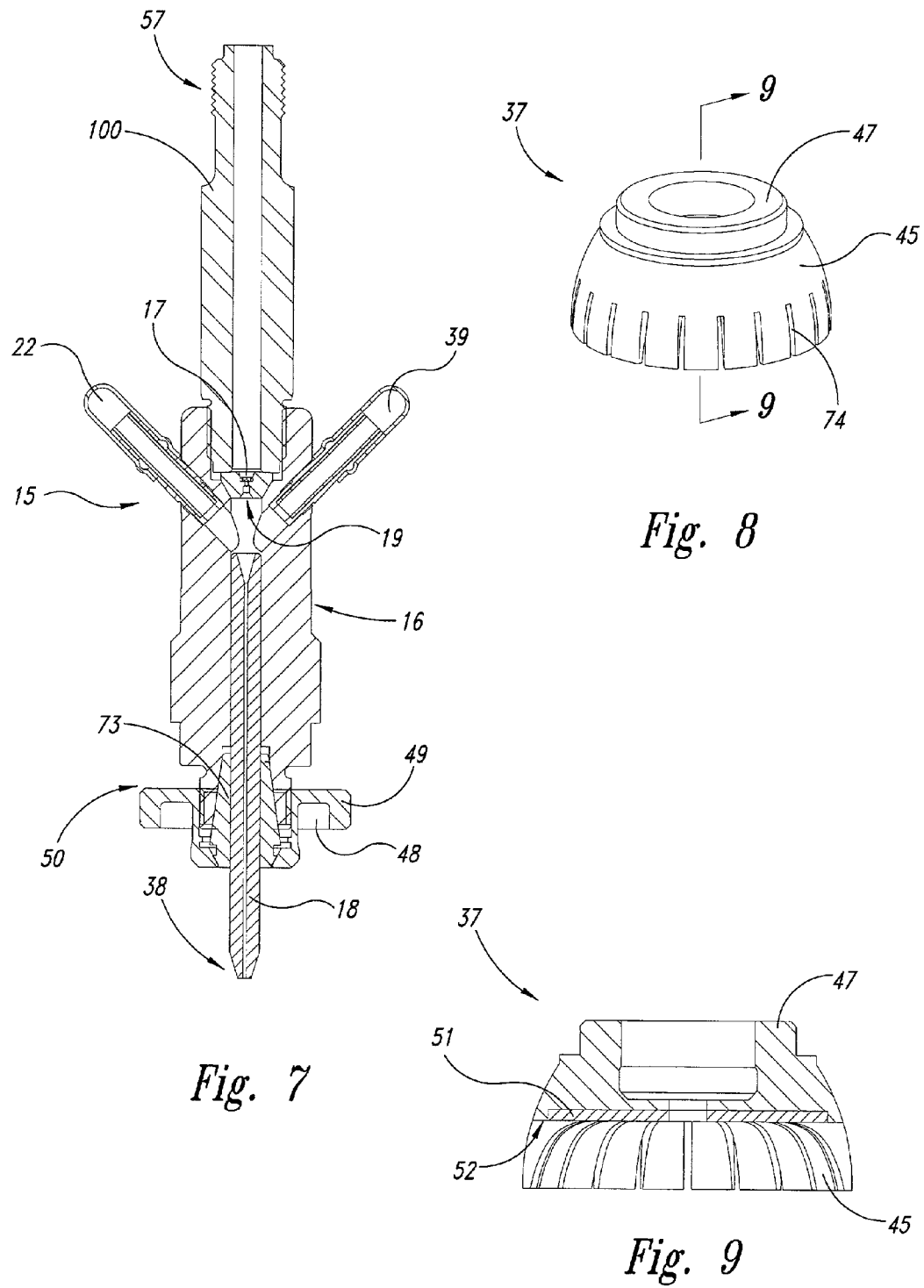

APPARATUS FOR GENERATING AND MANIPULATING A HIGH-PRESSURE FLUID JET

BACKGROUND OF THE INVENTION

1. Field of the Invention

The present invention relates to an apparatus for generating and manipulating a high-pressure fluid jet, and more particularly, to an apparatus for generating a high-pressure waterjet and manipulating it about multiple axes.

2. Description of the Related Art

High-pressure fluid jets, including high-pressure abrasive waterjets, are used to cut a wide variety of materials in many different industries. Systems for generating high-pressure abrasive waterjets are currently available, for example the Paser 3 system manufactured by Flow International Corporation, the assignee of the present invention. An abrasivejet cutting system of this type is shown and described in Flow's U.S. Pat. No. 5,643,058, which patent is incorporated herein by reference. In such systems, high-pressure fluid, typically water, flows through an orifice in a cutting head to form a high-pressure jet, into which abrasive particles are entrained as the jet flows through a mixing tube. The high-pressure abrasive waterjet is discharged from the mixing tube and directed toward a workpiece to cut the workpiece along a selected path.

Various systems are currently available to move a high-pressure fluid jet along a selected path. (The terms "high-pressure fluid jet" and "jet" used throughout should be understood to incorporate all types of high-pressure fluid jets, including but not limited to, high-pressure waterjets and high-pressure abrasive waterjets.) Such systems are commonly referred to as two-axis, three-axis and five-axis machines. Conventional three-axis machines mount the cutting head assembly on a ram that imparts vertical motion along a Z-axis, namely toward and away from the workpiece. The ram, in turn, is mounted to a bridge via a carriage, the carriage being free to move parallel to a longitudinal axis of the bridge in a horizontal plane. The bridge is slideably mounted on one or more rails to move in a direction perpendicular to the longitudinal axis of the bridge. In this manner, the high-pressure fluid jet generated by the cutting head assembly is moved along a desired path in an X-Y plane, and is raised and lowered relative to the workpiece, as may be desired. Conventional five-axis machines work in a similar manner but provide for movement about two additional rotary axes, typically about one horizontal axis and one vertical axis.

Manipulating a jet about five axes may be useful for a variety of reasons, for example, to cut a three-dimensional shape. Such manipulation may also be desired to correct for cutting characteristics of the jet or for the characteristics of the cutting result. More particularly, as understood by one of ordinary skill in the art, a cut produced by a jet, such as an abrasive waterjet, has characteristics that differ from cuts produced by more traditional machining processes. Two of the cut characteristics that may result from use of a high-pressure fluid jet are referred to as taper and trailback. Taper refers to the relative angle of a plane of the cut wall to a plane formed by the vectors of the jet and the direction of traverse. Trailback, also referred to as drag, identifies the phenomena that the fluid jet exits the workpiece at a point behind the point of entry of the jet into the workpiece, relative to the direction of travel. These two cut characteristics, namely taper and trailback, manifest themselves in geometrical anomalies that may or may not be acceptable, given the desired end product. Taper is typically not acceptable and requires an additional machining process to straighten the walls of the cut. Trailback effects cutting around corners and curves, the lag resulting in undesirable undercutting at the bottom (jet exit) side of the cut. In situations where it is desirable to minimize or eliminate taper and trailback, conventional 3D-cutting systems have been used with substantially reduced travel rates, primarily through trial and error, to allow the jet spreading characteristics to favorably alter the geometry of the cut. As this process is typically done by manual trial and error, it is time consuming and often unsuccessful.

Applicants believe it is desirable and possible to provide an improved system for generating and manipulating a high-speed fluid jet, for motion along one or more axes. The present invention provides such a system.

BRIEF SUMMARY OF THE INVENTION

Briefly, the present invention provides an improved system for generating and manipulating a high-pressure fluid jet, for example a high-pressure abrasive waterjet. More particularly, an end effector assembly is coupled to a ram for motion along a vertical axis that is substantially perpendicular to a workpiece to be cut by a high-pressure fluid jet. The ram is slideably coupled to a bridge by a carriage for motion along an axis that is parallel to a longitudinal axis of the bridge. The bridge in turn is slideably mounted on one or more rails to allow the bridge to move in a direction perpendicular to its longitudinal axis in a horizontal plane. In this manner, the end effector assembly is selectively moved along an X, Y and Z axis, as is known in the art.

The end effector assembly includes a cutting head assembly that carries both an orifice for generating a high-pressure fluid jet, and a mixing tube positioned within the body of the cutting head downstream of the orifice. The cutting head is coupled to a source of high-pressure fluid, and may also be coupled to a source of abrasive, to generate a high-pressure or high-speed abrasive fluid jet, as is known in the art.

In accordance with the present invention, a motion assembly is coupled to the cutting head via a clamp that is positioned around the body of the cutting head. In a preferred embodiment, the clamp is coupled to the cutting head downstream of the orifice location. By coupling the motion assembly to the cutting head adjacent the mixing tube, greater accuracy in positioning and manipulating the jet is achieved. An inner surface of the clamp mates with an outer surface of the cutting head assembly to fully support and position the cutting head assembly.

A nozzle body assembly is removably coupled to the cutting head assembly just upstream of the orifice. Given that the clamp supports the cutting head assembly, the nozzle body assembly may be separated from the cutting head to allow access to the orifice, without removing the cutting head assembly from the clamp. As orifices wear and need to be replaced, this ease of access provides a significant benefit over conventional systems.

Likewise, the cutting head assembly may be easily accessed and removed from the end effector assembly as desired, in accordance with the present invention. In a preferred embodiment, a quick release mechanism coupling a first portion of the clamp to a second portion of the clamp may be released by hand, without the use of tools, to allow the clamp to be opened, allowing access to the cutting head body. A guide provided on the clamp upstream of the first and second portions of the clamp, supports the nozzle body assembly in a weight-bearing manner when the cutting head assembly is separated from the nozzle body assembly and removed from the clamp. A triangularly arranged alignment member provided on an inner surface of the clamp allows the cutting head to be accurately positioned and repositioned in a predefined location.

The motion assembly is provided with two motors, each motor having an axis of rotation that is perpendicular to the other axis of rotation to form a gimbal wrist. In a preferred embodiment, the first axis of rotation is offset from the longitudinal axis of the bridge by 45°, thereby balancing the mass and reducing the moment of inertia about the horizontal X-axis. Alternatively, the axes of rotation are aligned with the X-Y axes of motion, defined by axes parallel and perpendicular to the longitudinal axis of the bridge.

A shield is coupled to an end region of the cutting head assembly, surrounding an end region of the mixing tube, to contain the spray of the waterjet. The shield is made of a flexible material so that as the mixing tube and jet are manipulated in 3D motion, the shield will flex when it comes into contact with the workpiece.

BRIEF DESCRIPTION OF THE SEVERAL VIEWS OF THE DRAWINGS

FIG. 2 is an isometric view of an end effector assembly provided in accordance with the present invention.

FIG. 3 is an isometric view of a material surface position sensor provided in accordance with the present invention.

FIG. 7 is a cross-sectional elevational view of a portion of the assembly of FIG. 2.

FIG. 8 is an isometric view of a shield provided in accordance with the present invention.

FIG. 9 is a cross-sectional view of a shield provided in accordance with the present invention, taken along line 9-9 of FIG. 8.

DETAILED DESCRIPTION OF THE INVENTION

Figure 1:
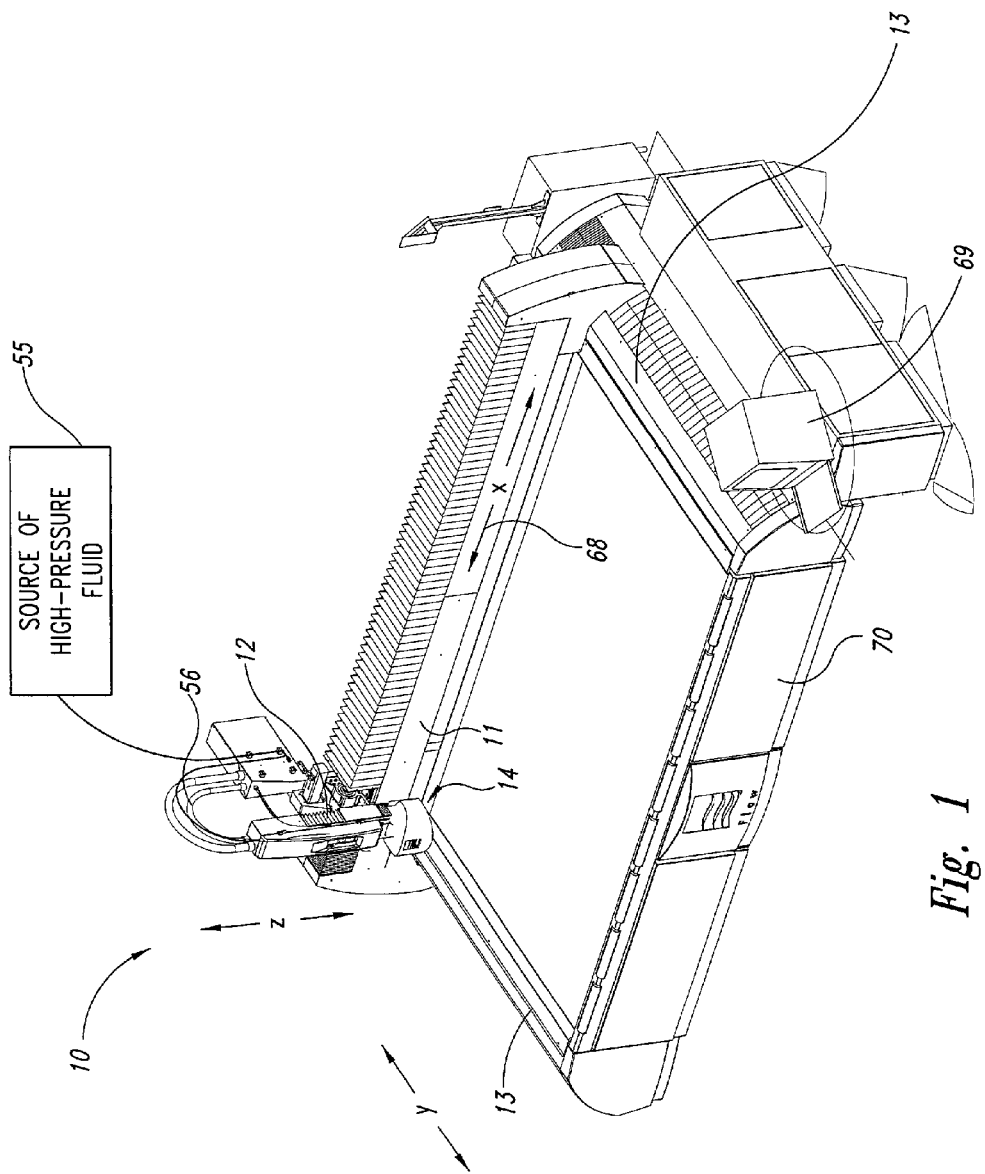
FIG. 1 is an isometric view of a high-pressure fluid jet machining assembly, provided in accordance with the present invention.

As illustrated in FIG. 1, an improved high-pressure abrasive waterjet system 10 is provided in accordance with a preferred embodiment of the present invention. (While the present invention will be described herein in the context of an abrasive waterjet, it should be understood that the present invention is not limited to abrasive waterjets, but may be used to generate and manipulate any type of high-pressure fluid jet.) An end effector assembly 14 provided in accordance with the present invention is mounted to a ram 12 for motion along a vertical Z-axis, as is known in the art. The ram 12 is slideably coupled to a bridge 11 for motion along an axis that is parallel to a longitudinal axis 68 of the bridge 11. As is further known in the art, bridge 11 is mounted on one or more rails 13 to allow the bridge 11 to move in a direction perpendicular to its longitudinal axis 68. As will be described in greater detail below, the end effector assembly 14 includes a cutting head assembly coupled to a source of high-pressure fluid 55 and to a source of abrasive 56 to generate a high-pressure abrasive waterjet. The abrasive waterjet is discharged from the end effector assembly 14 toward a workpiece positioned on table/catcher tank 70. The jet is manipulated to cut the workpiece along a selected path, using selected operating parameters, to achieve a desired end product. Although not shown in FIG. 1, it will be understood that more than one end effector 14 may be mounted to bridge 11. It will also be understood that while the invention is described herein in the context of a Cartesian type manipulator having a rail and bridge construction, the end effector provided in accordance with the present invention may be mounted and used in connection with any type of X-Y motion system.

As illustrated in FIG. 2, the end effector assembly 14 provided in accordance with the present invention includes a cutting head assembly 15. As seen in FIG. 7, the cutting head assembly 15 is provided with a body 16 that receives an orifice 17 at an orifice location 19. Also positioned within the body 16 of cutting head assembly 15 is a mixing tube 18, held in a selected and repeatable position via collet 73 and nozzle nut 49. As is known in the art, high-pressure fluid is provided to orifice 17 through nozzle body 30 to generate a high-pressure fluid jet into which abrasives may be entrained via port 22. (The cutting head assembly 15 is provided with a second port 39 to allow the introduction of a second fluid, for example air, or to allow the cutting head to be connected to a vacuum source or sensors.) The high-pressure fluid jet and entrained abrasives flow through mixing tube 18 and exit the mixing tube as an abrasive waterjet.

Figure 4:
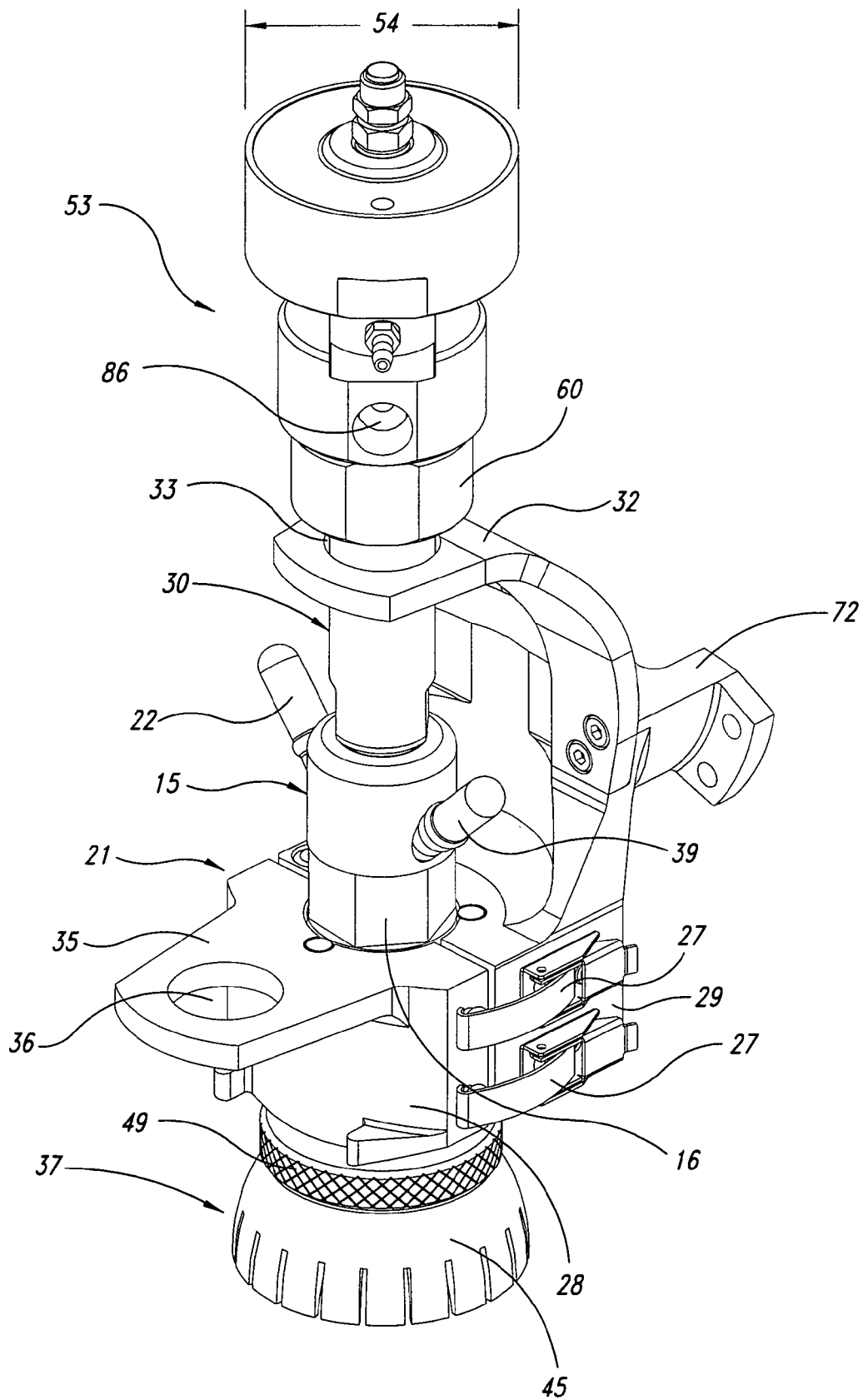
FIG. 4 is an isometric view of a portion of the end effector assembly of FIG. 2, with a clamp shown in a closed position.
Figure 5:
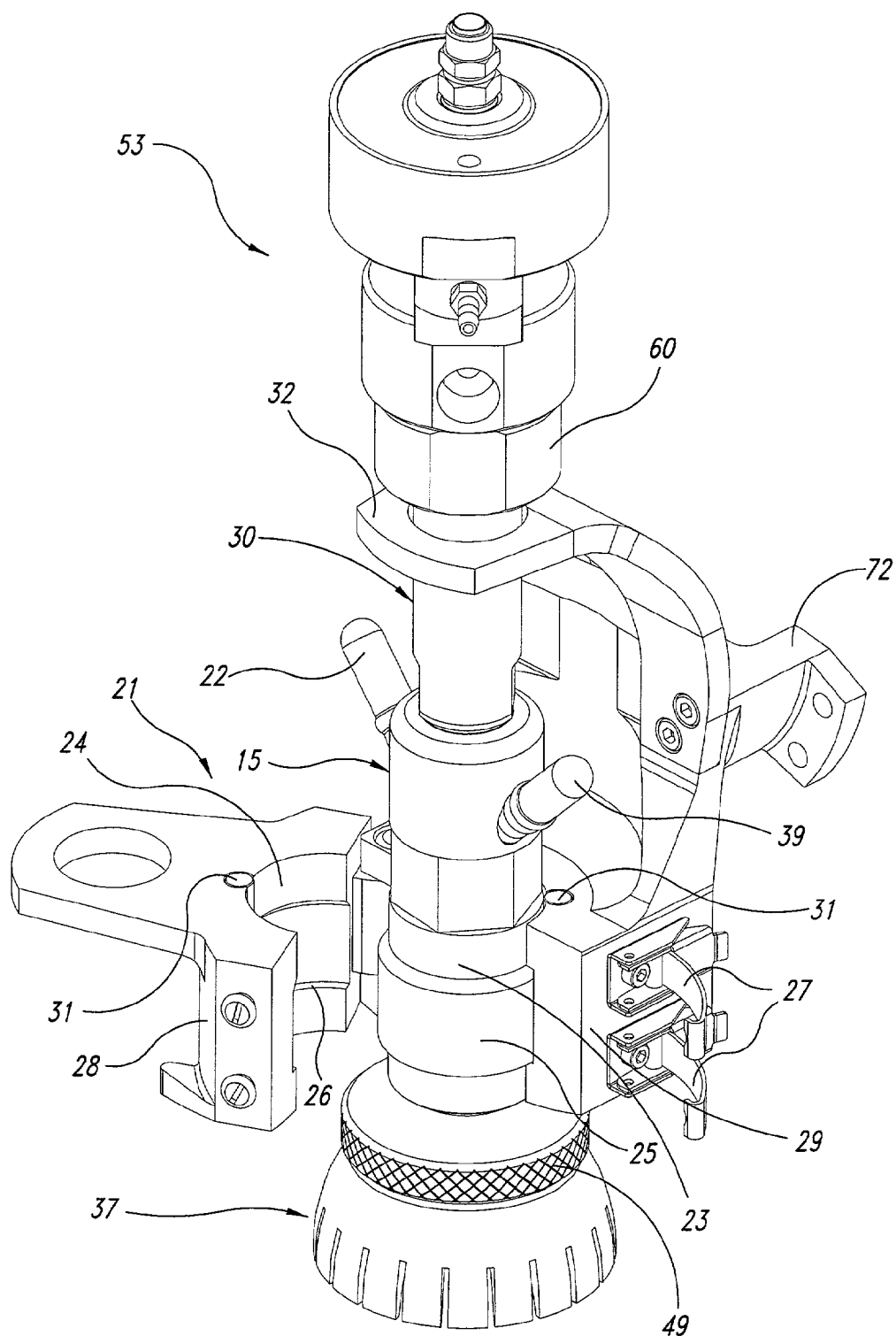
FIG. 5 is an isometric view of a portion of the end effector assembly of FIG. 2, with a clamp shown in an open position.
Figure 6:
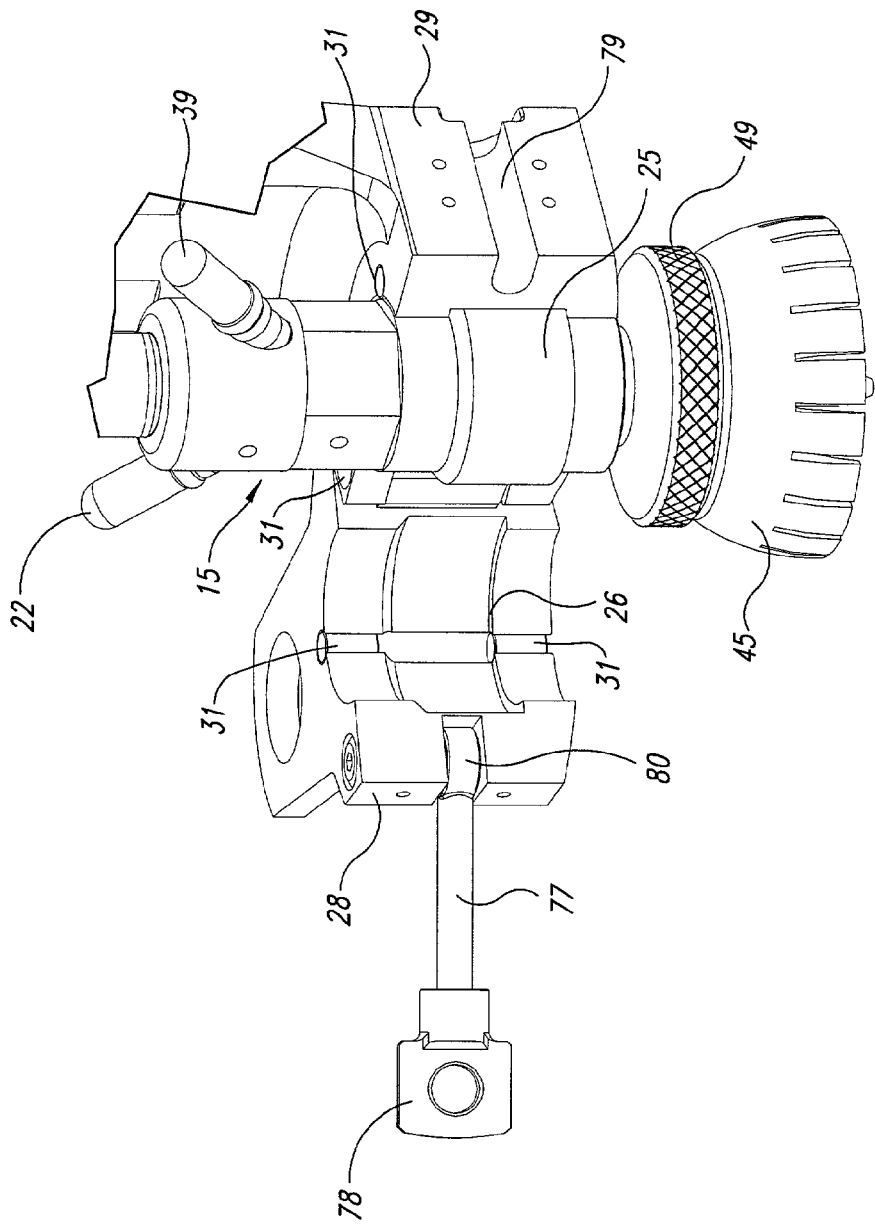
FIG. 6 is an isometric view of an alternative embodiment of a clamp provided in accordance with the present invention.

In accordance with a preferred embodiment of the present invention, as illustrated in FIGS. 2-6, a motion assembly 20 is coupled to the cutting head assembly 15 via a clamp 21 and bracket 72. In a preferred embodiment, the clamp 21 is positioned around the body 16 of the cutting head assembly, and more preferably, downstream of the orifice location 19. As best seen in FIGS. 5 and 6, an outer surface 23 of body 16 mates with an inner surface 24 of clamp 21 to vertically position and support the cutting head assembly 15. While this may be accomplished in a variety of ways, in a preferred embodiment, a boss 25 is provided on the outer surface 23 of body 16, the boss 25 resting upon a shelf 26 provided on the inner surface 24 of clamp 21. Alternatively, a raised portion of the inner surface of the clamp mates with a recess provided in the cutting head body.

Clamp 21 has a first portion 28 hingedly coupled to a second portion 29, the first and second portions of the clamp being secured by a quick release mechanism 81. The quick release mechanism allows an operator to open the clamp by hand, without the use of tools, allowing access to the cutting head assembly 15. While the quick release mechanism may be achieved in a variety of ways, two mechanisms are illustrated in the figures. More particularly, as best seen in FIGS. 4 and 5, the quick release mechanism may comprise one or more latches 27 extending between the first portion 28 and second portion 29 of the clamp. In an alternative preferred embodiment, as illustrated in FIG. 6, a stainless steel eyebolt 77 pivotally mounted to the first portion 28 of the clamp via shoulder screw 80 matingly engages recess 79 provided in the second portion 29 of the clamp when the clamp is closed. Knob 78 is then twisted until it tightens against a back surface of the clamp, thereby locking the first and second portions together.

A nozzle body assembly 30 comprising a nozzle body 100 coupled to a valve assembly 53, is removably coupled to the cutting head assembly 15 just upstream of the orifice 17, for example via a threaded connection. Given that the clamp 21 supports the cutting head assembly 15 downstream of the orifice, the nozzle body assembly 30 may be separated from the cutting head 15 to allow access to the orifice, without removing the cutting head assembly 15 from clamp 21. As orifices wear and need to be replaced, this ease of access provides a significant benefit over conventional systems.

As best seen in FIGS. 4 and 5, the clamp 21 is further provided with an upper guide 32 having an aperture 33 through which the nozzle assembly 30 passes. As a result, if it is desired to access cutting head assembly 15 via the quick release of clamp 21 and unscrew cutting head 15 from nozzle body assembly 30, the nozzle body 100 and valve assembly 53 coupled thereto are vertically supported by guide 32.

In a preferred embodiment of the present invention, the clamp 21 is provided with a triangularly arranged alignment member to position the cutting head assembly 15 in a desired location. Such alignment may be achieved in a variety of ways. For example, as illustrated in FIGS. 4-6, the alignment member may comprise three sets of two vertically aligned pins 31 that protrude inwardly from the inner surface 24 of the clamp. While the pins may be integral to the clamp, ease of manufacturing is improved by press fitting pins into the inner surface of the clamp. Alternatively, the inner surface of the clamp may be configured to contact an outer surface of the cutting head assembly in only three locations, for example by having a V-block construction. Providing an alignment member allows the cutting head assembly 15 to be accurately positioned and repositioned in a desired, predefined location within the system.

The clamp is further provided with a flange 35 having an opening 36 to receive and support a position sensor 34. In a preferred embodiment, the proximity sensor 34 senses the stand-off distance between a downstream end of mixing tube 18 and the surface of the material being machined. The position sensor may be of conventional construction, for example a Bimba position feedback cylinder, Part No. PFC-091.5-XP, and tooling ball by Carr Lane, Part No. CL-1-SCB. Alternatively, as illustrated in FIG. 3, the position sensor may include an angled probe 46 coupled to an annular sensor 75 positioned around an end region of mixing tube 18. If desired, a bottom surface of the sensor 75 may have small bristles 76 and/or may be spherical to facilitate its movement across the workpiece. The sensor 75 has a sufficiently large inner diameter, such that as the probe tip 46 is pneumatically raised away from the workpiece, the sensor 75 moves upward around the circumference of the mixing tube. By providing the position sensor proximal to the jet, the accuracy of the system is increased. Similarly, the accuracy with which the jet is positioned and manipulated is improved by clamping the motion assembly adjacent the mixing tube, which also serves to reduce the acceleration by the system needed to maneuver the tip of the mixing tube. Several advantages are therefore obtained by positioning the clamp in accordance with the present invention, and integrating the position sensor and the clamp.

A shield 37 is coupled to an end region 50 of cutting head assembly 15. As best seen in FIGS. 7-9, the shield 37 is provided with a flange 47 that forms an interference fit with groove 48 in nozzle nut 49. An annular skirt 45 extends downward from flange 47 surrounding an end region 38 of the mixing tube 18. In this manner, the shield substantially contains spray from the abrasive fluid jet. The shield is made of a flexible material, for example polyurethane, so that as the mixing tube 18 and jet are manipulated about one or more axes, the shield 37 flexes as it comes into contact with the workpiece, workpiece fixtures or cutting table. To further increase the flexibility of the shield, slits 74 are provided around the annular skirt 45. If desired, the flange 47 may be telescopic, allowing the shield 37 to be extended downward and upward relative to the end region of the cutting head assembly. In a preferred embodiment, as shown in FIG. 9, a disk 51 of hard material, such as carbide, is positioned in an upper, inner region 52 of the shield. Such a disk reduces the wear to the shield that occurs from the sprayback of the jet, particularly when the jet is first piercing the workpiece.

As best seen in FIG. 2, the motion assembly 20 includes a first motor 40 and second motor 41 coupled to form a gimbal wrist. The motion assembly 20, and therefore the end effector assembly 14, is mounted to ram 12 via bracket 71. Given the orientation of the coupling, a longitudinal axis 84 of bracket 71 is parallel to a longitudinal axis 68 of bridge 11. In a preferred embodiment, the first motor 40 has a first axis of rotation 82 and the second motor 41 has a second axis of rotation 83, the first and second axes of rotation being perpendicular to each other. As illustrated in FIG. 2, however, the first and second motors 40, 41 are mounted in such a way that the axes of rotation 82, 83 are neither parallel nor perpendicular to the longitudinal axis 68 of the bridge 11. In a preferred embodiment, the first axis of rotation 82 is offset from the longitudinal axis 68 of the bridge by 45°, thereby balancing the mass and reducing the moment of inertia about the X-axis. Alternatively, the two perpendicular, horizontal axes of rotation 82, 83 may be aligned with the X, Y axes of motion for the system, for example, aligned to be parallel and perpendicular to a longitudinal axis of a bridge. By using two horizontal rotary axes to tilt the jet, rather than a horizontal axis and vertical axis of rotation as in conventional five-axis systems, the supply lines for power, abrasive, water, air, etc. are not twisted with motion of the end effector, thereby simplifying the provision of these components to the system.

To provide high accuracy and a compact design, each of the first and second motors preferably have a diameter of no more than 200 mm and a length of no more than 250 mm, and more preferably, a diameter of substantially 100 mm and a length of substantially 90 mm. Each of the first and second motors, in a preferred embodiment, have a gear reduction ratio of no more than 200:1, and an encoder resolution of no more than 10,000 pulses-per-revs, and more preferably, a gear reduction ratio of 100:1, and an encoder resolution of 1,000 pulses-per-revs. Applicants believe that superior results are achieved when the motors have an actuator accuracy of no more than 3.0 arc-min. and an actuator repeatability of plus or minus no more than ten arc-sec. In a preferred embodiment, the actuator accuracy is 1.5 arc-min. and the actuator repeatability is plus or minus 5 arc-sec. Further advantages are obtained through the use of motors having a torque rating of no more than 51 Nm, and preferably, 7.8 Nm. If desired, the motors may be of hollow shaft construction, thereby allowing the high-pressure tubing to pass therethrough to deliver high-pressure fluid to the cutting head.

Alternatively, as illustrated in FIG. 2, the end effector assembly 14 includes a high-pressure fluid assembly 42 through which high-pressure tubing passes to deliver high-pressure fluid to the cutting head, via valve assembly 53. The high-pressure fluid assembly 42 incorporates an elbow 44 and a swivel 43, the swivel 43 being free to rotate about two axes which may be parallel to the wrist motors' axes of rotation. Use of swivel 43 therefore allows the high-pressure tubing contained therein to follow the motion imparted by the gimbal wrist of the motion assembly 20 to the cutting head assembly 15. To further improve the dynamics of the system, a largest diameter 54 of the valve assembly 53 is no more than 4.0 inches.

Figure 10:
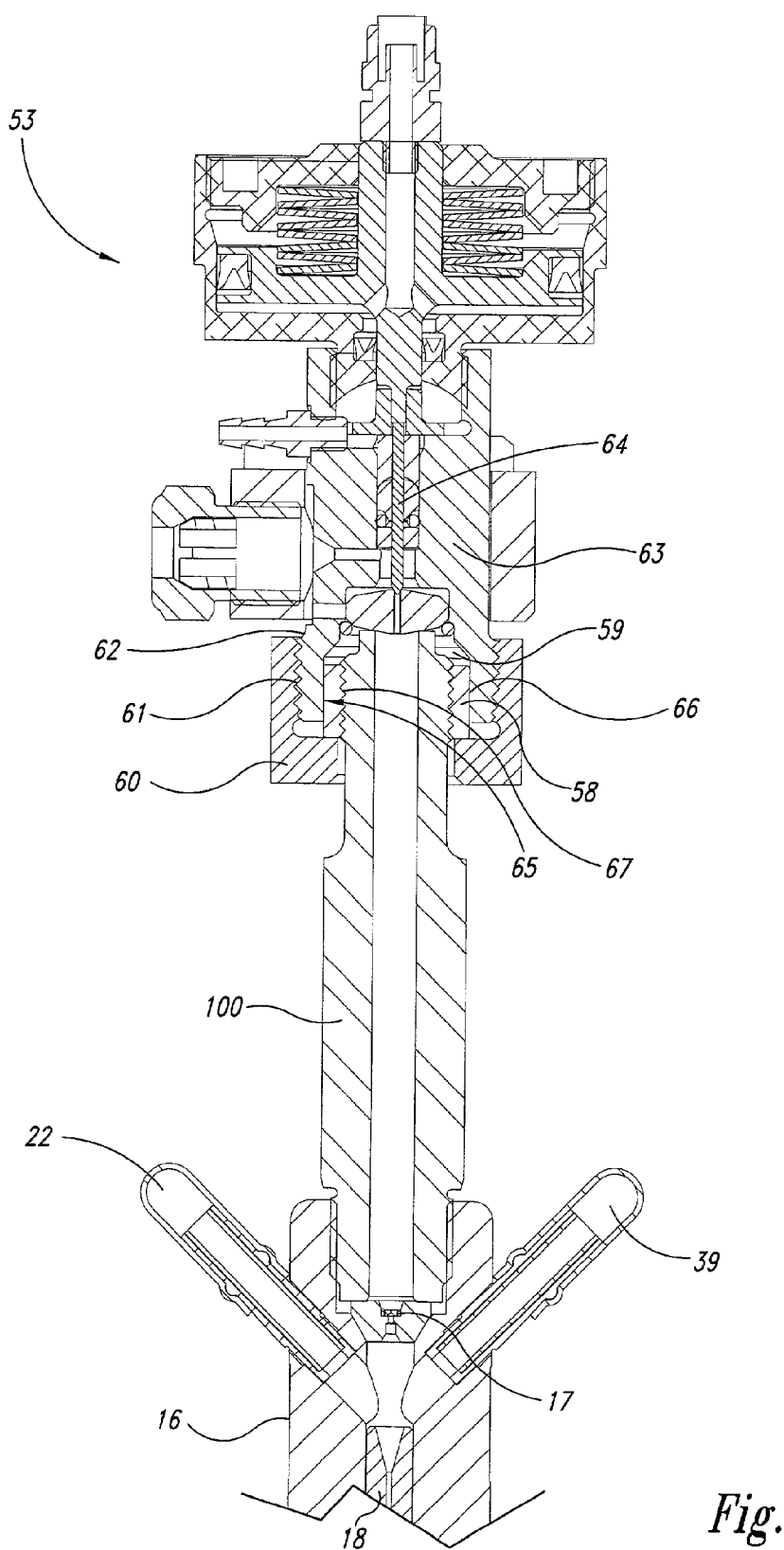
FIG. 10 is a cross-sectional elevational view of a portion of the end effector assembly of FIG. 2, showing the connection between a valve assembly and a nozzle body.

As illustrated in FIG. 10, the valve assembly 53 includes a valve body 63 and valve mechanism 64 that selectively allows high-pressure fluid to flow through it when the valve body is coupled to the source of high-pressure fluid. In conventional systems, external threads on an upper region of the nozzle body 100 engage threads provided on an inner surface of the valve body 63. However, depending on the starting point of the operation to thread the nozzle body 100 into the valve body 63, the orientation of the entry port 86 for high-pressure tubing into the valve assembly 53, and the orientation of ports 22, 39, cannot be predicted with accuracy. It traditionally therefore may take several attempts to align the nozzle body 100 and valve body 63 in a desired location, which is important, given the relative rigidity of high-pressure tubing. This problem is overcome in accordance with a preferred embodiment of the present invention, wherein a collar 58 having a smooth outer surface 65 and threaded inner surface 67 is received in a recess 59 in valve body 63. The wall 66 of recess 59 is also smooth, such that the collar is free to rotate within the recess. The threaded inner surface 67 of collar 58 engages threads on the upper region 57 of the nozzle body 100. As such, collar 58 is threaded onto nozzle body 100, and the assembly is then inserted into valve body 63 and oriented as desired. A nut 60, carried by nozzle body 100, is then threaded onto threads 61 provided on an outer surface 62 of the valve body, thereby coupling the nozzle body to the valve assembly while maintaining the valve and nozzle body in the selected orientation.

A system provided in accordance with the present invention therefore imparts motion to a high-pressure fluid jet about 1-5 axes, thereby causing the jet to cut along a path while in a selected orientation. The orientation parameters and process parameters for the system are controlled through a software system 69, as described and claimed in U.S. Pat. No. 6,766,216, entitled METHOD AND SYSTEM FOR AUTOMATED SOFTWARE CONTROL OF WATERJET ORIENTATION PARAMETERS, incorporated herein by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An end effector assembly comprising:
a cutting head adapted to receive an orifice at an orifice location for generating a high-pressure fluid jet, and having a mixing tube coupled to the cutting head downstream of the orifice location;
a motion assembly coupled to the cutting head via a clamp positioned around the cutting head, the motion assembly being configured to be coupled to a bridge for motion parallel to a longitudinal axis of the bridge, the motion assembly further comprising a gimbal wrist provided with a first motor having a first axis of rotation and with a second motor having a second axis of rotation, the first and second axes of rotation being perpendicular to each other but neither parallel nor perpendicular to the longitudinal axis of the bridge when the motion assembly is coupled thereto; and
a raised member provided on one of an outer surface of the cutting head and an inner surface of the clamp and a recess provided on the other of the outer surface of the cutting head and the inner surface of the clamp, the raised member mating with the recess in a weight-bearing manner to vertically position and support the cutting head.

2. The end effector assembly according to claim 1 wherein the clamp has a quick-release mechanism allowing a portion of the clamp to be easily moved away from the cutting head.

3. The end effector assembly according to claim 1, further comprising a nozzle body assembly removably coupled to the cutting head, the clamp holding the cutting head when the nozzle body assembly is separated from the cutting head, thereby allowing access to the orifice location without removing the cutting head from the clamp.

4. The end effector assembly according to claim 3 wherein the clamp further comprises an upper guide coupled to the nozzle body assembly, the upper guide vertically supporting the nozzle body assembly when the cutting head is removed from the clamp.

5. The end effector assembly according to claim 1 wherein the clamp is provided with a triangularly arranged alignment member to position the cutting head in a desired location.

6. The end effector assembly according to claim 5 wherein the triangularly arranged alignment member comprises pins that protrude inwardly from the inner surface of the clamp.

7. The end effector assembly according to claim 1 wherein a position sensor is coupled to the clamp adjacent the cutting head.

8. The end effector assembly according to claim 1, further comprising a shield coupled to an end region of the cutting head, the shield surrounding an end region of the mixing tube and being made of a flexible material.

9. The end effector assembly according to claim 1, further comprising a high-pressure fluid assembly coupled to the cutting head, the high-pressure fluid assembly having a swivel through which high-pressure tubing passes to deliver high-pressure fluid to the cutting head, the swivel allowing the high-pressure tubing to follow motion imparted by the motion assembly to the cutting head.

10. An end effector assembly comprising:
a cutting head having a body adapted to receive an orifice at an orifice location for generating a high-pressure fluid jet, and having a mixing tube coupled to the body of the cutting head downstream of the orifice location;
a motion assembly coupled to the cutting head via a clamp positioned around the body of the cutting head, the motion assembly being configured to be coupled to a bridge for motion along a longitudinal axis of the bridge, the motion assembly further comprising a gimbal wrist provided with a first motor having a first axis of rotation and with a second motor having a second axis of rotation, the first and second axes of rotation being perpendicular to each other but neither parallel nor perpendicular to the longitudinal axis of the bridge when the motion assembly is coupled thereto; and
a nozzle body assembly removably coupled to the cutting head, the clamp holding the cutting head when the nozzle body assembly is separated from the cuffing head, thereby allowing access to the orifice location without removing the cutting head from the clamp.

11. The end effector assembly according to claim 10 wherein the clamp has a quick-release mechanism allowing a portion of the clamp to be easily moved away from the body of the cutting head.

12. The end effector assembly according to claim 10 wherein the clamp is provided with a triangularly arranged alignment member to position the cutting head in a predefined location.

13. The end effector assembly according to claim 12 wherein the triangularly arranged alignment member comprises pins that protrude inwardly from the inner surface of the clamp.

14. The end effector assembly according to claim 12 wherein the inner surface of the clamp is configured to contact an outer surface of the cutting head at three locations around the circumference of the cutting head, such that the inner surface of the clamp forms the triangularly arranged alignment member.

15. The end effector assembly according to claim 10 wherein the clamp further comprises an upper guide coupled to the nozzle body assembly, the upper guide vertically supporting the nozzle body assembly when the cutting head is removed from the clamp.

16. The end effector assembly according to claim 10 wherein a position sensor is coupled to the clamp adjacent the cutting head.

17. The end effector assembly according to claim 16 wherein the position sensor is provided with a tip that is angled toward an end of the mixing tube, an end region of the tip being adjacent the end of the mixing tube.

18. The end effector assembly according to claim 10, further comprising a shield coupled to an end region of the cutting head, the shield surrounding an end region of the mixing tube and being made of a flexible material.

19. The end effector assembly according to claim 18 wherein the shield is provided with a flange that matingly engages a groove provided in the end region of the cutting head.

20. The end effector according to claim 18 wherein a disk of hard material is positioned in an upper, inner region of the shield.

21. The end effector assembly according to claim 10, further comprising a high-pressure fluid assembly coupled to the cutting head, the high-pressure fluid assembly having a swivel through which high-pressure tubing passes to deliver high-pressure fluid to the cutting head, the swivel allowing the high-pressure tubing to follow motion imparted by the motion assembly to the cutting head.

22. The end effector assembly according to claim 21 wherein the swivel is coupled to a valve having a diameter that is no more than 4.0 inches.

23. The end effector assembly according to claim 10 wherein the clamp is positioned around the body of the cutting head downstream of the orifice location.

24. An end effector assembly comprising:
   a cutting head having a body adapted to receive an orifice at an orifice location for generating a high-pressure fluid jet, and having a mixing tube coupled to the body of the cutting head downstream of the orifice location; and
   a motion assembly coupled to the cutting head via a clamp positioned around the body of the cutting head downstream of the orifice location, the clamp having a quick-release mechanism to allow a portion of the clamp to be easily moved away from the body of the cutting head, the motion assembly being configured to be coupled to a bridge for motion along a longitudinal axis of the bridge, the motion assembly further comprising a gimbal wrist provided with a first motor having a first axis of rotation and with a second motor having a second axis of rotation, the first and second axes of rotation being perpendicular to each other but neither parallel nor perpendicular to the longitudinal axis of the bridge when the motion assembly is coupled thereto.

25. The end effector assembly according to claim 24, further comprising a nozzle body assembly removably coupled to the cutting head, the clamp holding the cutting head when the nozzle body assembly is separated from the cutting head, thereby allowing access to the orifice location without removing the cutting head from the clamp.

26. The end effector assembly according to claim 24 wherein the clamp is provided with a triangularly arranged alignment member to position the cutting head in a predefined location.

27. The end effector assembly according to claim 24 wherein the clamp further comprises an upper guide coupled to the nozzle body assembly, the upper guide vertically supporting the nozzle body assembly when the cutting head is removed from the clamp.

28. The end effector assembly according to claim 24 wherein a position sensor is coupled to the clamp adjacent the cutting head.

29. The end effector assembly according to claim 24, further comprising a shield coupled to an end region of the cutting head, the shield surrounding an end region of the mixing tube and being made of a flexible material.

30. The end effector assembly according to claim 24, further comprising a high-pressure fluid assembly coupled to the cutting head, the high-pressure fluid assembly having a swivel through which high-pressure tubing passes to deliver high-pressure fluid to the cutting head, the swivel allowing the high-pressure tubing to follow motion imparted by the motion assembly to the cutting head.

31. An end effector assembly comprising:
   a cutting head having a body adapted to receive an orifice at an orifice location for generating a high-pressure fluid jet, and having a mixing tube coupled to the body of the cutting head downstream of the orifice location;
   a motion assembly coupled to the cutting head via a clamp positioned around the body of the cutting head;
   a nozzle body assembly removably coupled to the cutting head, the clamp holding the cutting head when the nozzle body assembly is separated from the cutting head, thereby allowing access to the orifice location without removing the cutting head from the clamp; and
   a high-pressure fluid assembly coupled to the cutting head, the high-pressure fluid assembly having a swivel operable to rotate about two axes and through which high-pressure tubing passes to deliver high-pressure fluid to the cutting head, the swivel allowing the high-pressure tubing to follow motion imparted by the motion assembly to the cutting head.

32. The end effector assembly according to claim 31 wherein the motion assembly further is configured to be coupled to a bridge for motion along a longitudinal axis of the bridge, the motion assembly further comprising a gimbal wrist provided with a first motor having a first axis of rotation and with a second motor having a second axis of rotation, the first and second axes of rotation being perpendicular to each other but neither parallel nor perpendicular to the longitudinal axis of the bridge when the motion assembly is coupled thereto.

33. An apparatus for generating and manipulating a fluid jet comprising:
   an end effector assembly coupled to a ram for motion along a vertical axis, the ram being coupled to a bridge for motion along an axis that is parallel to a longitudinal axis of the bridge, the bridge being moveable in a direction perpendicular to its longitudinal axis, the end effector assembly further comprising a cutting head having a body adapted to receive an orifice at an orifice location for generating a high-pressure fluid jet, and having a mixing tube coupled to the body of the cutting head downstream of the orifice location; and
   a motion assembly coupled to the cutting head via a clamp positioned around the body of the cutting head, the motion assembly having a gimbal wrist provided with a first motor having a first axis of rotation and with a second motor having a second axis of rotation, the first and second axes of rotation being perpendicular to each other but neither parallel nor perpendicular to the longitudinal axis of the bridge.

34. The apparatus according to claim 33, further comprising:
a shield coupled to an end region of the cutting head, the shield surrounding an end region of the mixing tube.

35. The apparatus according to claim 33, further comprising:
a nozzle body assembly removably coupled to the cutting head, the clamp holding the cutting head when the nozzle body assembly is separated from the cutting head, thereby allowing access to the orifice location without removing the cutting head from the clamp.

36. The apparatus according to claim 33 wherein the cutting head is coupled to a source of high-pressure fluid and to a source of abrasive.

37. The apparatus according to claim 33, further comprising:
a two-dimensional manipulator coupled to an end of the end effector assembly.

38. An end effector assembly comprising:
a cutting head having a body adapted to receive an orifice at an orifice location for generating a high-pressure fluid jet, and having a mixing tube coupled to the body of the cutting head downstream of the orifice location; and
a motion assembly coupled to the cutting head via a clamp positioned around the body of the cutting head, the clamp having a quick-release mechanism to allow a portion of the clamp to be easily moved away from the body of the cutting head; wherein
the motion assembly is configured to be coupled to a bridge for motion along a longitudinal axis of the bridge, the motion assembly further comprising a gimbal wrist provided with a first motor having a first axis of rotation and with a second motor having a second axis of rotation, the first and second axes of rotation being perpendicular to each other but neither parallel nor perpendicular to the longitudinal axis of the bridge when the motion assembly is coupled thereto.

39. An apparatus for generating and manipulating a fluid jet comprising:
a cutting head having a body adapted to receive an orifice at an orifice location for generating a high-pressure fluid jet, and having a mixing tube coupled to the body of the cutting head downstream of the orifice location; and
a high-pressure fluid assembly coupled to the cutting head, the high-pressure fluid assembly having a swivel operable to rotate about two axes and configured to allow high-pressure tubing to pass therethrough to deliver high-pressure fluid to the cutting head, the swivel allowing the high-pressure tubing to follow motion imparted to the cutting head.

40. An end effector assembly comprising:
a cutting head having a body adapted to receive an orifice at an orifice location for generating a high-pressure fluid jet, and having a mixing tube coupled to the body of the cutting head downstream of the orifice location; and
a motion assembly coupled to the cutting head and configured to be coupled to a bridge for motion along a longitudinal axis of the bridge, the motion assembly further comprising a gimbal wrist provided with a first motor having a first axis of rotation and with a second motor having a second axis of rotation, the first and second axes of rotation being perpendicular to each other but neither parallel nor perpendicular to the longitudinal axis of the bridge when the motion assembly is coupled thereto.

* * * * *

UNITED STATES PATENT AND TRADEMARK OFFICE
CERTIFICATE OF CORRECTION

PATENT NO. : 7,464,630 B2  Page 1 of 1
APPLICATION NO. : 09/940689
DATED : December 16, 2008
INVENTOR(S) : Michael Knaupp et al.

It is certified that error appears in the above-identified patent and that said Letters Patent is hereby corrected as shown below:

Column 8
Line 50, claim 10, "cuffing" should read --cutting--.

Signed and Sealed this

Ninth Day of March, 2010

David J. Kappos
*Director of the United States Patent and Trademark Office*